US009462444B1

(12) United States Patent
Fish et al.

(10) Patent No.: US 9,462,444 B1
(45) Date of Patent: Oct. 4, 2016

(54) CLOUD BASED COLLABORATIVE MOBILE EMERGENCY CALL INITIATION AND HANDLING DISTRIBUTION SYSTEM

(75) Inventors: Ram David Adva Fish, Menlo Park, CA (US); Henry Messenger, Campbell, CA (US); Evgenia Goldshtein, Madison, NJ (US)

(73) Assignee: Nortek Security & Control LLC, Carlsbad, CA (US)

( * ) Notice: Subject to any disclaimer, the term of this patent is extended or adjusted under 35 U.S.C. 154(b) by 0 days.

(21) Appl. No.: 13/237,879

(22) Filed: Sep. 20, 2011

Related U.S. Application Data (60) Provisional application No. 61/516,479, filed on Apr. 4, 2011, provisional application No. 61/516,480, filed on Apr. 4, 2011, provisional application No. 61/404,379, filed on Oct. 4, 2010.

(51) Int. Cl.
*H04W 4/22* (2009.01)

(52) U.S. Cl.
CPC .................................. *H04W 4/22* (2013.01)

(58) Field of Classification Search
CPC .................................................. H04W 76/007
See application file for complete search history.

(56) References Cited

U.S. PATENT DOCUMENTS

| 6,975,941 | B1 * | 12/2005 | Lau ........................ G01C 21/00 340/539.13 |
| 7,177,397 | B2 | 2/2007 | McCalmont et al. |
| 7,181,192 | B2 * | 2/2007 | Panasik ............. H04M 1/72538 340/436 |
| 7,238,156 | B1 | 7/2007 | Adamczyk |
| 7,894,849 | B2 * | 2/2011 | Kass .................... A61B 5/0002 340/521 |
| 8,121,673 | B2 | 2/2012 | Tran |
| 8,183,999 | B1 * | 5/2012 | Giallorenzi ........ G08B 21/0266 340/539.13 |
| 8,843,101 | B2 | 9/2014 | Fish et al. |
| 2004/0162035 | A1 * | 8/2004 | Petersen et al. ............. 455/90.1 |
| 2004/0259566 | A1 * | 12/2004 | Maanoja et al. ........... 455/456.1 |
| 2006/0234727 | A1 | 10/2006 | Ashley, Jr. et al. |
| 2006/0279426 | A1 | 12/2006 | Bonnet et al. |
| 2007/0072583 | A1 * | 3/2007 | Barbeau ............ H04M 3/42348 455/404.2 |
| 2008/0133277 | A1 | 6/2008 | Jang et al. |
| 2008/0311878 | A1 * | 12/2008 | Martin .................... G08B 25/08 455/404.1 |
| 2009/0186596 | A1 * | 7/2009 | Kaltsukis ............... G08B 25/08 455/404.2 |
| 2009/0315719 | A1 | 12/2009 | Song et al. |
| 2009/0322513 | A1 * | 12/2009 | Hwang .............. A61B 5/02055 340/539.12 |
| 2010/0003953 | A1 * | 1/2010 | Ray et al. .................. 455/404.1 |
| 2010/0176952 | A1 * | 7/2010 | Bajcsy ..................... A61B 5/11 340/573.1 |

(Continued)

OTHER PUBLICATIONS

"U.S. Appl. No. 13/237,857, Response filed Jun. 26, 2013 to Non-Final Office Action mailed Mar. 26, 2013", 12 pgs.

Li, Qiang, "Accurate, Fast Fall Detection Using Gyroscopes and Accelerometer-Derived Posture Information", Sixth International Workshop on Wearable and Implantable Body Sensor Networks, BSN 2009, (2009), 138-143.

(Continued)

*Primary Examiner* — Nathan Mitchell
*Assistant Examiner* — Frank Donado
(74) *Attorney, Agent, or Firm* — Schwegman Lundberg & Woessner, P.A.

(57) ABSTRACT

An apparatus wearable by a user for automatically contacting a public safety access point (PSAP) is disclosed. The wearable apparatus includes several sensors for obtaining datasets. One of datasets is a location of a user. The wearable apparatus also includes a cellular transceiver. The cellular transceiver transmits the datasets to a cloud computing system, receives a classification of the datasets as a user state from the cloud computing system, and contacts a safety access point (PSAP) (e.g., 9-1-1 emergency services, an automated emergency call center, etc.) based on the location of the user.

17 Claims, 8 Drawing Sheets

(56) References Cited

U.S. PATENT DOCUMENTS

| | | |
|---|---|---|
| 2010/0217533 A1 | 8/2010 | Nadkarni et al. |
| 2010/0304705 A1* | 12/2010 | Hursey ................. 455/404.1 |
| 2011/0028118 A1* | 2/2011 | Thomas ............ H04M 1/2745 |
| | | 455/404.1 |
| 2011/0066383 A1 | 3/2011 | Jangle et al. |
| 2011/0195687 A1* | 8/2011 | Das ................... H04W 4/02 |
| | | 455/404.2 |
| 2011/0199216 A1 | 8/2011 | Flinsenberg et al. |
| 2011/0201299 A1* | 8/2011 | Kamdar ................ 455/404.1 |
| 2012/0007713 A1 | 1/2012 | Nasiri |
| 2012/0094628 A1* | 4/2012 | Mader et al. ........... 455/404.1 |
| 2012/0095722 A1 | 4/2012 | Ten et al. |
| 2012/0101411 A1 | 4/2012 | Hausdorff et al. |
| 2012/0101770 A1 | 4/2012 | Grabiner et al. |
| 2014/0365164 A1 | 12/2014 | Fish et al. |

OTHER PUBLICATIONS

"U.S. Appl. No. 13/237,857, Amendment and Response filed Mar. 6, 2013 to Final Office Action mailed Dec. 6, 2012", 14 pgs.

"U.S. Appl. No. 13/237,857, Amendment and Response filed Sep. 17, 2012 to Non-Final Office Action mailed Jun. 15, 2012", 12 pgs.

"U.S. Appl. No. 13/237,857, Final Office Action mailed Dec. 6, 2012", 17 pgs.

"U.S. Appl. No. 13/237,857, Non-Final Office Action mailed Mar. 26, 2013", 17 pgs.

"U.S. Appl. No. 13/237,857, Non-Final Office Action mailed Jun. 15, 2012", 17 pgs.

"U.S. Appl. No. 13/237,857, Non-Final Office Action mailed Sep. 17, 2013", 16 pgs.

"U.S. Appl. No. 13/237,857, Notice of Allowance mailed May 20, 2014", 12 pgs.

"U.S. Appl. No. 13/237,857, Response filed Jan. 17, 2014 to Non-Final Office Action mailed Sep. 17, 2013", 10 pgs.

\* cited by examiner

CLOUD BASED COLLABORATIVE MOBILE EMERGENCY CALL INITIATION AND HANDLING DISTRIBUTION SYSTEM

CROSS-REFERENCE TO RELATED APPLICATION

This application claims the benefit of U.S. Provisional Patent Application No. 61/516,479, filed Apr. 4, 2011, entitled "DISTRIBUTED SYSTEM TO CLASSIFY HUMAN ACTIVITY ACROSS A WAN," U.S. Provisional Patent Application No. 61/516,480, filed Apr. 4, 2011, entitled "CLOUD BASED MOBILE EMERGENCY CALL INITIATION AND HANDLING," and U.S. Provisional Patent Application No. 61/404,379, filed Oct. 4, 2010, entitled "FALL DETECTION SYSTEM USING A COMBINATION OF ACCELEROMETER, AUDIO INPUT AND MAGNETOMETER," disclosures of which are incorporated herein by reference in its entirety.

TECHNICAL FIELD

Embodiments of the present invention relate generally to health care-based monitoring systems, and more particularly, to a system and method for permitting a wearable device worn by a user to automatically contact and transmit a user state to a public safety access point (PSAP).

BACKGROUND

For certain age groups, such as the elderly, or people that engage in certain dangerous activities, such as firefighters and soldiers, it is desirable to track and understand human activity automatically. For example, a person that has fallen may be injured, unconscious, etc., and needs emergency assistance. In such circumstances, relying on the person to initiate a call to a public safety access point (PSAP) (e.g., 9-1-1 emergency services, an automated emergency call center, etc.) is not practical. Moreover, even if the person is capable of placing the call, the PSAP may be located outside the geographical jurisdiction for providing emergency services. An emergency services person located at a PSAP may need to manually place a second call to the local fire station, police, or Emergency Medical Services (EMS) squad, thereby wasting precious time that could be used to save the person's life. Further, if the person is unconscious, they would not be able to relate the nature of their injuries nor their physical location.

As a result, many activity detection systems and devices have been developed. Unfortunately, such systems require several sensors to be distributed in several locations on or in the vicinity of a user, which is not convenient for the user nor is it practical to implement when the user is in an unfamiliar environment. Moreover, most if not all conventional activity detection systems require continuous monitoring and classification, thereby consuming large amounts of processing and electrical power. Further, such systems have a limited ability to learn from prior events (i.e., detecting and eliminating false positive and negatives).

Other systems and devices have been developed which attempt to locate the injured person and route that person's location to an appropriate local PSAP. One such system is described in U.S. Pat. No. 7,177,397 (hereinafter the '397 patent). The '397 patent discloses a system for routing emergency services calls from call centers to PSAPs, and to provide data in connection with such calls (e.g., latitude and longitude, street address, vehicle collision data, etc.) related to the caller. In particular, the system of the '397 patent provides an emergency services complex (ESC) that has a map of PSAP boundaries covering a large area. Unfortunately, the system of the '397 patent is only concerned with deriving caller information provided from within a telephone network and initiated by an ordinary cell phone or land line, such as information derived from a caller ID, which may or may not be accurate.

US Patent Application Publication No. 2006/0234727 (hereinafter the '727 application) describes a system for making an emergency voice call from a portable computing device. The portable computing device communicates with a cellular base station. A cellular base station identifier that corresponds to the cellular base station is determined. A PSAP associated with the cellular base station identifier is determined. The PSAP identifier corresponds to a PSAP responsible for handling emergency calls being routed through the cellular base station. A voice call destination number is identified. The voice call destination number is associated with the PSAP identifier. The voice call destination number is utilized to communicate with the PSAP. The system of the '727 application is configured to determine a person's physical location based on physical parameters, and from that location identify the most local PSAP to contact.

Unfortunately, the systems described in both the '397 patent and the '727 application do not automatically provide a diagnosis of the nature of the emergency event without the verbal aid of the caller.

BRIEF DESCRIPTION OF THE DRAWINGS

Embodiments of present invention will be more readily understood from the detailed description of exemplary embodiments presented below considered in conjunction with the attached drawings in which like reference numerals refer to similar elements and in which.

DETAILED DESCRIPTION

Embodiments of the invention provide an apparatus wearable by a user for automatically contacting a public safety access point (PSAP). The wearable device includes several sensors for obtaining datasets. One of datasets is a location of a user obtained from an aGPS receiver. The wearable device also includes an cellular transceiver. The cellular transceiver transmits the datasets to a cloud computing system, receives emergency assistance instructions from the cloud computing system, and contacts a safety access point (PSAP) (e.g., 9-1-1 emergency services, an automated emergency call center, etc.) based on the location of the user.

The cloud computing system may send emergency assistance instructions upon classifying the datasets as a certain user state. A user state may include a user physical state (e.g., a user fall inside or outside a building, a user fall from a bicycle, a car incident involving a user, etc.) or an emotional state (e.g., a user screaming, a user crying, etc.). The cloud computing system may comprise at least one server communicatively connected via a network to the wearable device.

In one embodiment, the cloud computing system is configured to receive datasets of raw measurements based on an event from the wearable device via the network, where one of the datasets is audio. The cloud computing system is configured to extract features from the datasets. The cloud computing system classifies the features as or as not a pre-defined state of the user (e.g., a fall).

In one embodiment, the datasets may include audio recorded by an audio capturing module such as microphones; and one or both of acceleration from an accelerometer and change in orientation (e.g., rotation angles change) calculated based on accelerometer, magnetometer and gyroscope measurements. The audio data may originate from the user's voice, the user's body, and the environment. Optionally, the datasets may include data received from other sensors, such as data from external health sensors (e.g., an EKG, blood pressure device, weight scale, glucometer) connected via a short-range Bluetooth® transceiver.

In one embodiment, the wearable device receives a command via a network (e.g. a cellular network) from the cloud computing system to contact a PSAP based on the location of the user. In one embodiment, the wearable device includes in the datasets transmitted to the cloud computing system, its position/location obtained from the aGPS receiver. Based on the received location/position of the user and the nature of the classified user state, the cloud computing system decides which type of PSAP (e.g., 9-1-1) is most suited to handle the type of user state (e.g., a fall) and queries a database as to the PSAP of that type nearest to the position/location of the user.

In one embodiment, data identifying the selected PSAP is transmitted to the wearable device. In another embodiment, the wearable device is instructed by the cloud computing system to call a PSAP known to the wearable device based on its location. In another embodiment, the wearable device automatically calls a PSAP triggered by receiving the user state from the cloud computing system, or calculated on the device. In still another embodiment, the wearable device automatically calls a call center, which in turn, relays the user state to the PSAP.

Figure 1:
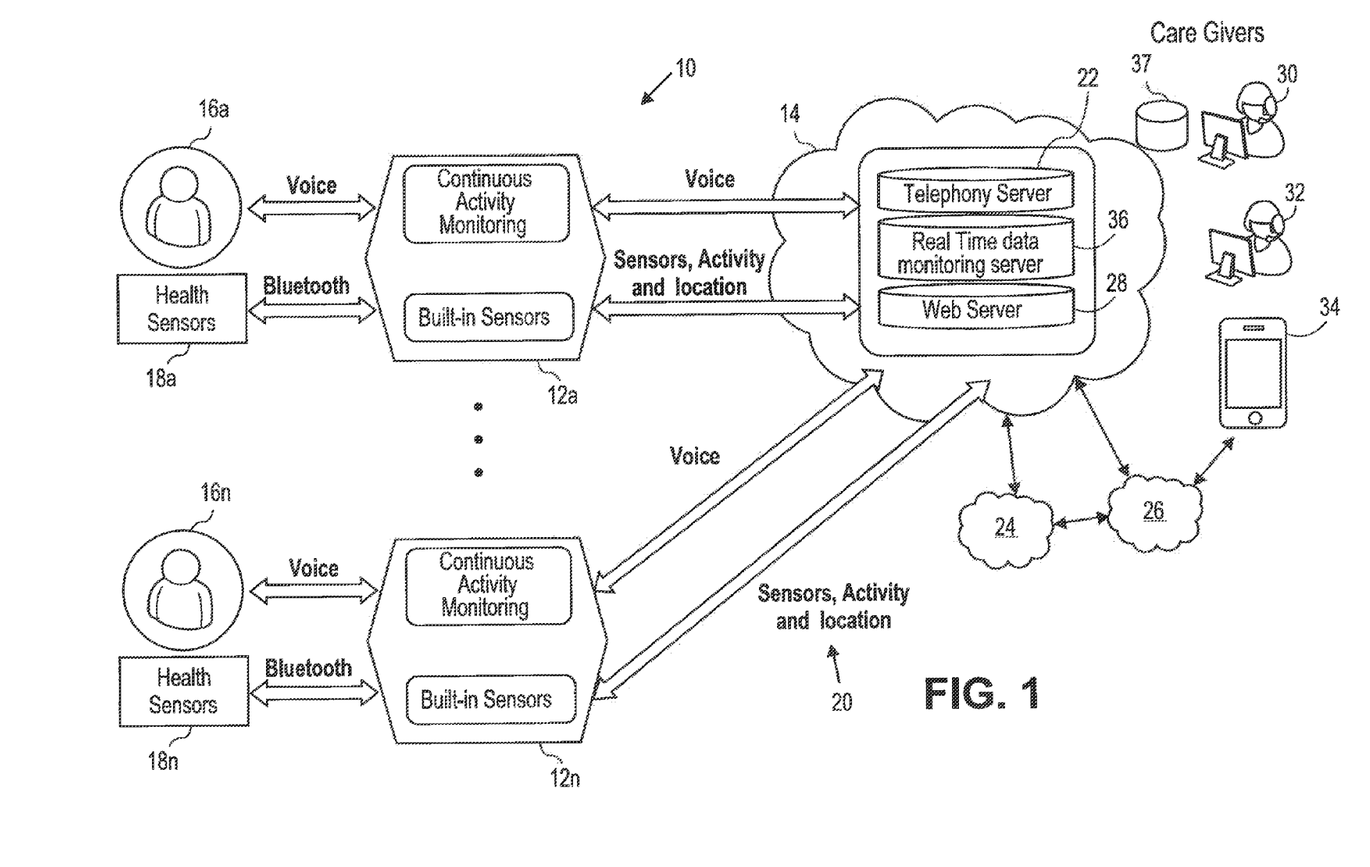
FIG. 1 depicts one embodiment of a system for detecting a predefined user state.

FIG. 1 depicts one embodiment of a system 10 for detecting predefined user states. The system 10 includes wearable devices 12a-12n communicatively connected to a distributed cloud computing system 14. A wearable device 12 may be a small-size computing device that can be worn as a watch, a pendant, a ring, a pager, or the like, and can be held in any orientation.

In one embodiment, each of the wearable devices 12a-12n is operable to communicate with a corresponding one of users 16a-16n (e.g., via a microphone, speaker, and voice recognition software), external health sensors 18a-18n (e.g., an EKG, blood pressure device, weight scale, glucometer) via, for example, a short-range OTA transmission method (e.g., Bluetooth®), a PSAP 19, and the distributed cloud computing system 14 via, for example, a long range OTA transmission method (e.g., over a 3G or 4G cellular transmission network 20). Each wearable device 12 is configured to detect a predefined state of a user. The predefined state may include a user physical state (e.g., a user fall inside or outside a building, a user fall from a bicycle, a car incident involving a user, a user taking a shower, etc.) or an emotional state (e.g., a user screaming, a user crying, etc.). As will be discussed in more detail below, the wearable device 12 may include multiple sensors for detecting a predefined user state. For example, the wearable user device 12 may include an accelerometer for measuring an acceleration of the user, a magnetometer for measuring a magnetic field associated with the user's change of orientation, a gyroscope for providing a more precise determination of orientation of the user, and a microphone for receiving audio. Based on data received from the above sensors, the wearable device 12 may identify a suspected user state, and then categorize the suspected user state as an activity of daily life, a confirmed predefined user state, or an inconclusive event. The wearable user device 12 may then communicate with the distributed cloud computing system 14 to obtain a re-confirmation or change of classification from the distributed cloud computing system 14. In another embodiment, the wearable user device 12 transmits data provided by the sensors to the distributed cloud computing system 14, which then determines a user state based on this data.

Cloud computing provides computation, software, data access, and storage services that do not require end-user knowledge of the physical location and configuration of the system that delivers the services. The term "cloud" refers to one or more computational services (e.g., servers) connected by a computer network.

The distributed cloud computing system 14 may include one or more computers configured as a telephony server 22 communicatively connected to the wearable devices 12a-12n, the Internet 24, and one or more cellular communication networks 20, including, for example, the public circuit-switched telephone network (PSTN) 26. The distributed cloud computing system 14 may further include one or more computers configured as a Web server 28 communicatively connected to the Internet 24 for permitting each of the users 16a-16n to communicate with a call center 30, first-to-answer systems 32, and care givers and/or family 34. The distributed cloud computing system 14 may further include one or more computers configured as a real-time data monitoring and computation server 36 communicatively connected to the wearable devices 12a-12n for receiving measurement data, for processing measurement data to draw conclusions concerning a potential predefined user state, for transmitting user state confirmation results and other commands back to the wearable devices 12a-12n, and for storing and retrieving present and past historical predefined user state data from a database 37 which may be employed in the user state confirmation process, and in retraining further optimized and individualized classifiers that can in turn be transmitted to the wearable device 12a-12n.

Figure 2:
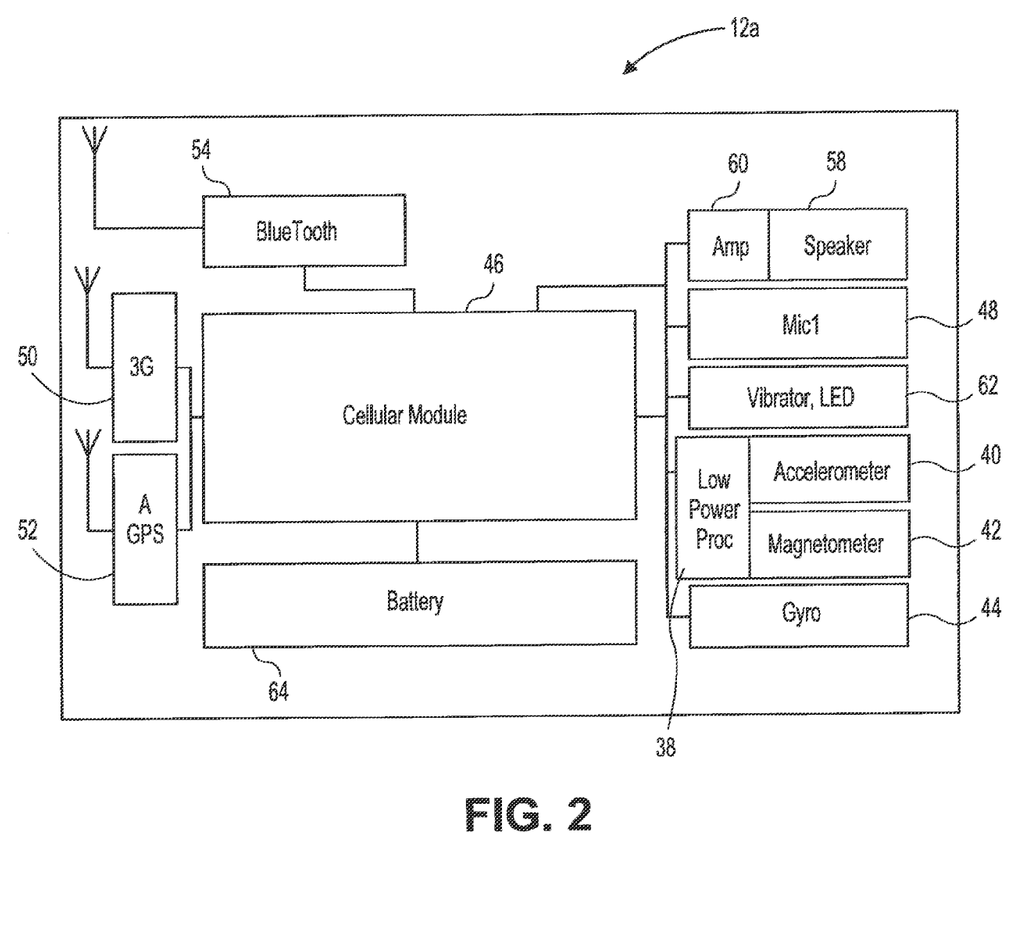
FIG. 2 is a block diagram of one embedment of the components of a wearable device employed in the system of FIG. 1.

FIG. 2 is a block diagram of one embodiment of the components of a wearable device 12a employed in the system of FIG. 1. The wearable device 12a may include a low-power processor 38 communicatively connected to an accelerometer 40 (e.g., a two- or more-axis accelerometer)

for detecting acceleration events (e.g., high, low, positive, negative, oscillating, etc.), a magnetometer 42 (preferably a 3-axis magnetometer) for assessing an orientation of the wearable device 12a, and a gyroscope 44 for providing a more precise determination of orientation of the wearable device 12a. The low-power processor 38 is configured to receive continuous or near-continuous real-time measurement data from the accelerometer 40, the magnetometer 42, and the gyroscope 44 for rendering tentative decisions concerning predefined user states. By utilizing the above components, the wearable device 12 is able to render these decisions in relatively low-computationally expensive, low-powered manner and minimize false positive and false negative errors. A cellular module 46, such as the 3G IEM 6270 manufactured by QCOM, includes a high-computationally-powered microprocessor element and internal memory that are adapted to receive the suspected fall events from the low-power processor 38 and to further correlate orientation data received from the optional gyroscope 44 with digitized audio data received from one or more microphones 48 (preferably, but not limited to, a micro-electro-mechanical systems-based (MEMS) microphone(s)). The audio data may include the type, number, and frequency of sounds originating from the user's voice, the user's body, and the environment.

The cellular module 46 is also configured to receive commands from and transmit data to the distributed cloud computing system 14 via a 3G or 4G transceiver 50 over the cellular transmission network 20. The cellular module 46 is further configured to communicate with and receive position data from an aGPS receiver 52, and to receive measurements from the external health sensors 18a-18n via a short-range Bluetooth® transceiver 54. In addition to recording audio data for fall analysis, the cellular module 46 is further configured to permit direct voice communication between the user 16a and the PSAP 19 (e.g. 9-1-1, an emergency response center, etc.), a call center 30, first-to-answer systems 32 (e.g. a fire station, a police station, a physician's office, a hospital, etc.), or care givers and/or family 34 via a built-in speaker 58 and an amplifier 60. Either directly or via the cloud computing system 14, the cellular module 46 is further configured to permit the user 16a to conduct a conference connection with one or more of a PSAP 19, the call center 30, the first-to-answer systems 32, and/or care givers and/or family 34. The cellular module 46 may receive/operate one or more input and output indicators 62 (e.g., one or more mechanical and touch switches (not shown), a vibrator, LEDs, etc.). The wearable device 12a also includes an on-board battery power module 64. The wearable device 12a may also include empty expansion slots (not shown) to collect readings from other internal sensors (i.e., an inertial measurement unit), for example, a pressure sensor (for measuring air pressure, i.e., attitude) or heart rate, blood perfusion, etc.

Figure 3:
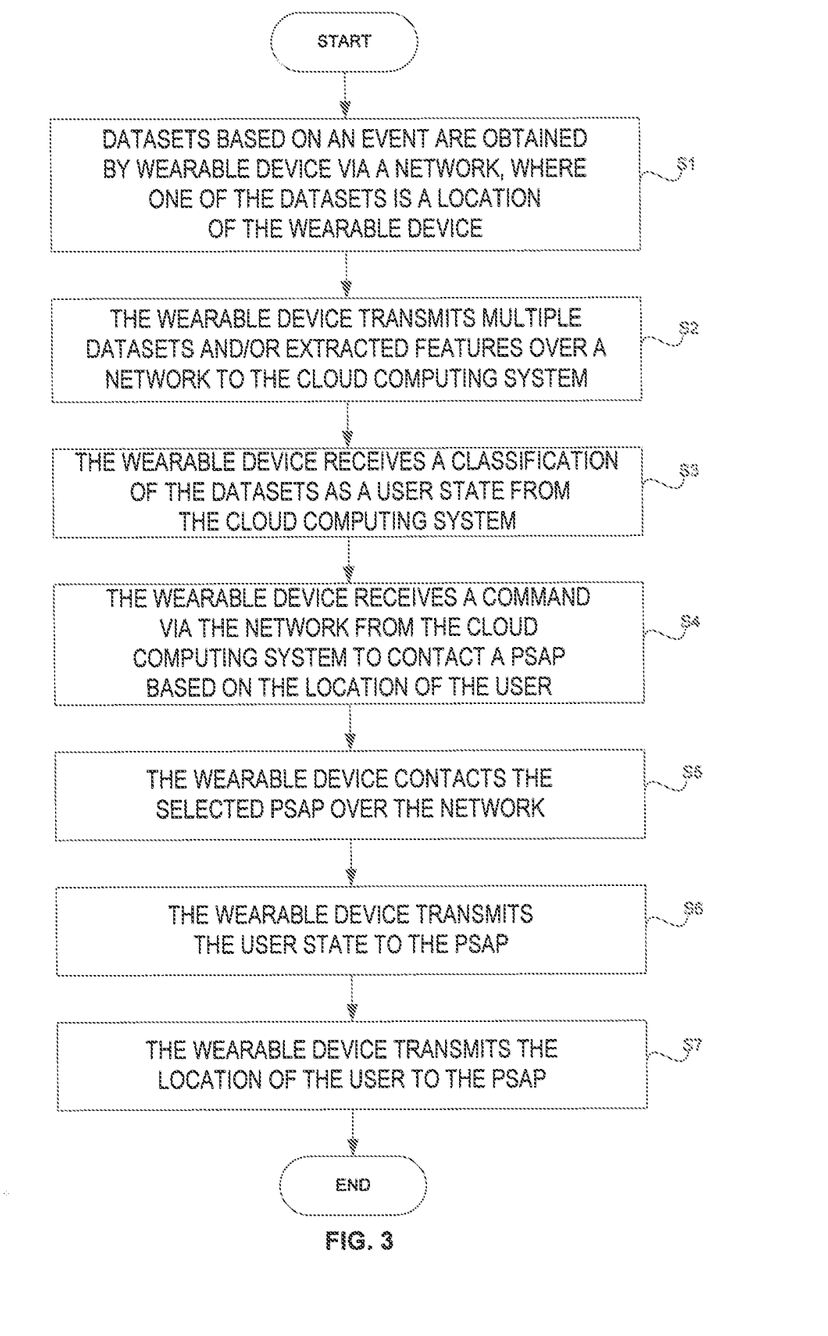
FIG. 3 is a flow diagram of one embodiment of a method for automatically contacting a public safety access point (PSAP) from the perspective of the wearable device of FIG. 2.

FIG. 3 is a flow diagram of one embodiment of a method for automatically contacting a public safety access point (PSAP) from the perspective of the wearable device employed in the system of FIG. 1. The method is performed by processing logic that may include hardware (circuitry, dedicated logic, etc.), software (such as is run on a general purpose computer system or a dedicated machine), or a combination of both.

Referring to FIGS. 1-3, at block S1, the wearable device 12a obtains datasets, where one of the datasets is position/location. More particularly, the low-power processor 38 and/or the cellular module 46 within the wearable device 12a obtain datasets from one or more sensors. The datasets include audio recorded by the audio capturing module (not shown) such as microphones 48 and the cellular module 46; and one or both of acceleration from the accelerometer 40 and orientation (e.g., rotation angles) calculated using the accelerometer 40, magnetometer 42 and gyroscope 44 measurements. The audio data may originate from the user's voice, the user's body, and the environment. The datasets may include data received from other on-board sensors, such as position data from the aGPS receiver 52, and other data from the external health sensors 18a-18n (e.g., an EKG, blood pressure device, weight scale) via the short-range Bluetooth® transceiver 54.

In one embodiment, some of the sensors may run continuously, while others may be triggered on a specific measurement or time event (which helps conserve power). Data collection may begin at preset times, as a result of commands from the data monitoring and computation server 36, or based on a measured trigger (e.g., acceleration level). Data collection may be terminated based on a command from the data monitoring and computation server 36, at a preset time, on a specific trigger (e.g., a period of little movement), or after a predefined amount of time.

Features may be extracted from the datasets. As used herein, a feature may be a time domain property, a frequency domain property, a signal dynamics property, and/or an inter-signals dynamic property. Time domain properties may include, but are not limited to, vertical velocity, rotation angle, vertical distance peaks, EKG signals, blood pressure, weight, etc. Frequency domain properties may include, but are not limited to, spectral envelope, dominant frequency, and periodicity measurement for any of the time domain properties listed above. A signal dynamic property may include, but is not limited to, a change over time of a time or frequency domain property, such as a change in signal amplitude of one of the time domain properties listed above, or a change of frequency content of the time domain properties listed above. An inter-signal dynamic property may include, but is not limited to, elapsed time between a change in two different types of time domain or frequency domain measurements, such as acceleration and audio peaks or acceleration and rotation rate peaks.

Figure 4:
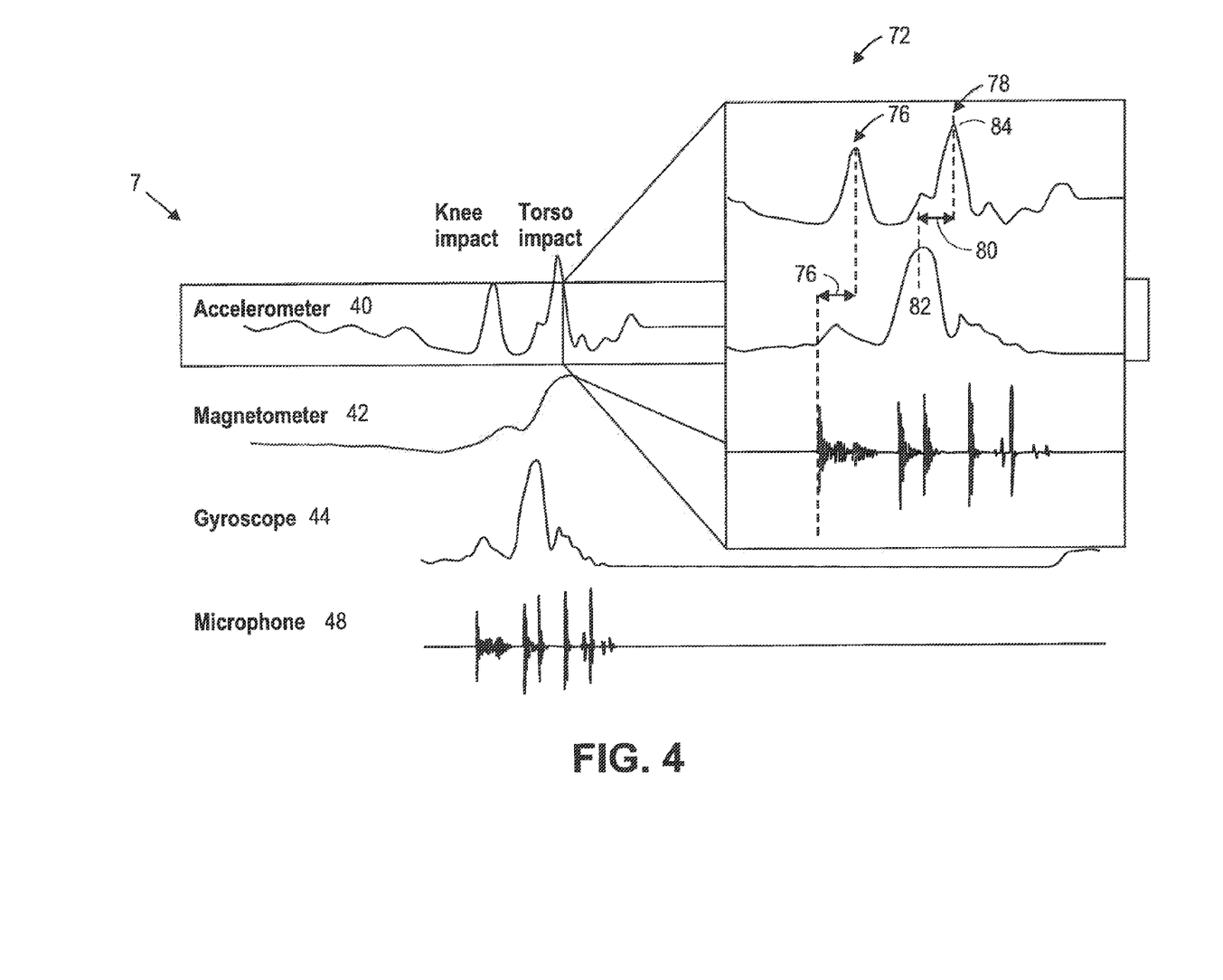
FIG. 4 depicts measurements over time of inter-signal dynamic properties.

Examples of inter-signal dynamic properties are shown in FIG. 4. FIG. 4 depicts measurements over time 70 of the accelerometer 40, the magnetometer 42, the gyroscope 44, and the microphone 48 (audio) recorded using a wearable device 12a positioned on the subject's torso. The exploded view of the measurements 72 shows a first time difference 74 between a beginning of a first peak in an audio measurement 76 and a subsequent peak of acceleration 78 due to a knee impact of a person with a floor in the process of falling. The exploded view of the measurements 72 also shows a second time difference 80 between a peak in a gyroscope measurement 82 and a subsequent peak of acceleration 84 due to a torso impact of the person with the floor in the process of falling.

Figure 5:
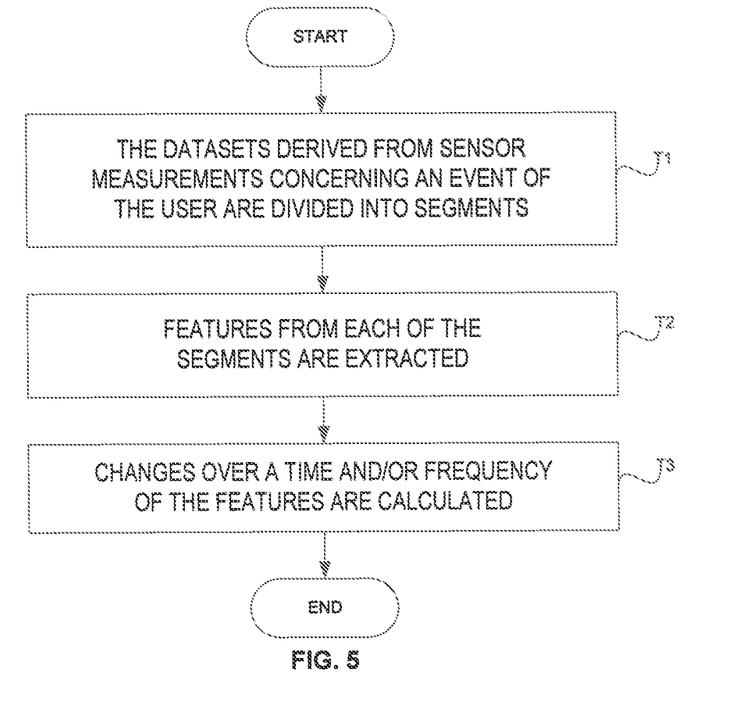
FIG. 5 depicts a flow diagram of one embodiment of a method for segmenting datasets of measurements.

Extracting features may involve segmentation. FIG. 5 is a flow diagram of one embodiment of a method for segmenting (datasets of) measurements. At block T1, the datasets derived from sensor measurements concerning an event of the user are divided into segments. At block T2, features from each of the segments are extracted. At block T3, changes over time of time or frequency domain features are calculated.

Figure 6A:
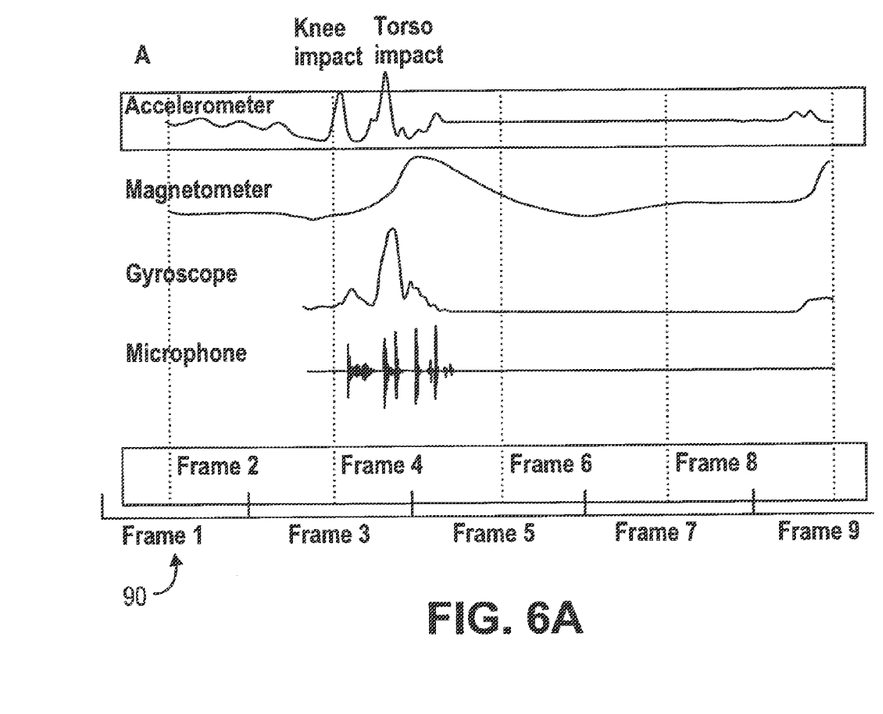
FIG. 6A is a graph depicting one embodiment of a method for segmenting datasets of measurements by dividing the datasets into equal length frames with overlap between the frames.
Figure 6B:
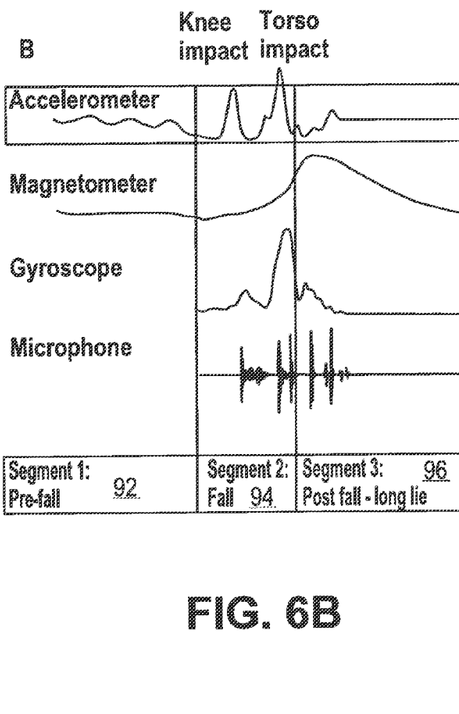
FIG. 6B is a graph depicting one embodiment of a method for segmenting datasets of measurements by dividing the datasets according to triggering events.

There are a number of ways to divide the datasets: one example may be to divide the datasets into equal length frames 90 with overlap between the frames 90 as depicted in FIG. 6A, and another example is to divide the datasets according to portions of an event (e.g., pre-fall 92, fall 94, and post-fall-long lie 96) as depicted in FIG. 6B.

Returning now to FIG. 3, at block S2, the wearable device 12a transmits multiple datasets and/or extracted features over a network (e.g., the cellular transmission network 20) to the cloud computing system 14 (e.g., the data monitoring and computation server 36). Extracting features may take place on the wearable device 12a or on the real-time data monitoring and computation server 36 of the cloud computing system 14. The decision whether to send raw measurement data and/or extracted features to the data monitoring and computation server 36 may be made dynamically within the wearable device 12a or the raw measurement data and/or extracted features may be requested by the data monitoring and computation server 36 (e.g., raw data may be stored on the wearable device 12a for a period of time). If the wearable device 12a makes a dynamic decision or the data monitoring and computation server 36 sends a command to the wearable device 12a to transmit raw measurements/extracted features to the data monitoring and computation server 36, the cellular module 48 transmits the measurements/extracted features to the real-time data monitoring and computation server 36 of the distributed cloud computing system 14 via a network (e.g., the 3G/4G transceiver 50 and the cellular transmission network 20). The real-time data monitoring and computation server 36 may then extract the features from the measurement data and may then return the extracted features to the cellular module 48 for classification or the real-time data monitoring and computation server 36 may directly perform the classification. In the latter embodiment, the data monitoring and computation server 36 may employ on-demand cloud computing to, for example, exploit massive parallelism and GPU computing to return a more accurate classification in real-time to the wearable device 12a.

The decision as to whether to extract features on the wearable device 12a or on the data monitoring and computation server 36 depends to a large degree on whether the wearable device 12a has sufficient processing power and/or electrical power. In general, stronger algorithms may be applied based on the sensor data transmitted to the real-time data monitoring and computation server 36 of the distributed cloud computing system 14 (as a result, power may be conserved in the wearable device 12a by restricting the low-power processor 38 and/or the cellular module 48 to relatively simple initial assessment algorithms).

At block S3, the wearable device 12a receives a classification of the datasets as a user state from the cloud computing system 14. In order to classify a new event, the extracted features are compared to the characteristics of previously learned movements and activities. The classification may be fully automatic, by employing one or more trained classifiers to be described below in connection with FIG. 7, or in some cases may be decided by a human operator, based on features or through a conversation with the person being monitored.

Once the data monitoring and computation server 36 receives or computes features, confirmation of the suspected activity may takes place. In one embodiment, an event classified as a suspected user state may be classified as a "confirmed user state" or "not the confirmed user state". In another embodiment, a confirmed user state may be further classified as a fall, a stumble, a normal ADL, or an inconclusive event. In another embodiment, additional classification methods may be employed to further categorize a fall, stumble, ADL as to the kind of fall, stumble, ADL, the severity of the fall, stumble, etc.

The classification may be fully automatic, or in some cases, decided by a human operator based on the computed features or based on a conversation with the user 16a via execution of a voice-to-text algorithm, the speaker 58, and the microphone(s) 48 on the wearable device 12a, and/or via an interactive voice response system (IVR) integrated with the Web server 28.

The stronger algorithms that may be employed include, but are not limited to, the use of classifiers. A person skilled in the art would recognize that any suitable trained classifier may be employed, including, but not limited to, a gaussian mixture model (GMM), a support vector machines (SVM) or hidden markov model (HMM), as is known in the art. In one embodiment, two GMMs per user state type are employed: one trained on positive samples indicative of a specific user state taking place and one trained on negative samples indicative of the specific user state not taking place.

Figure 7:
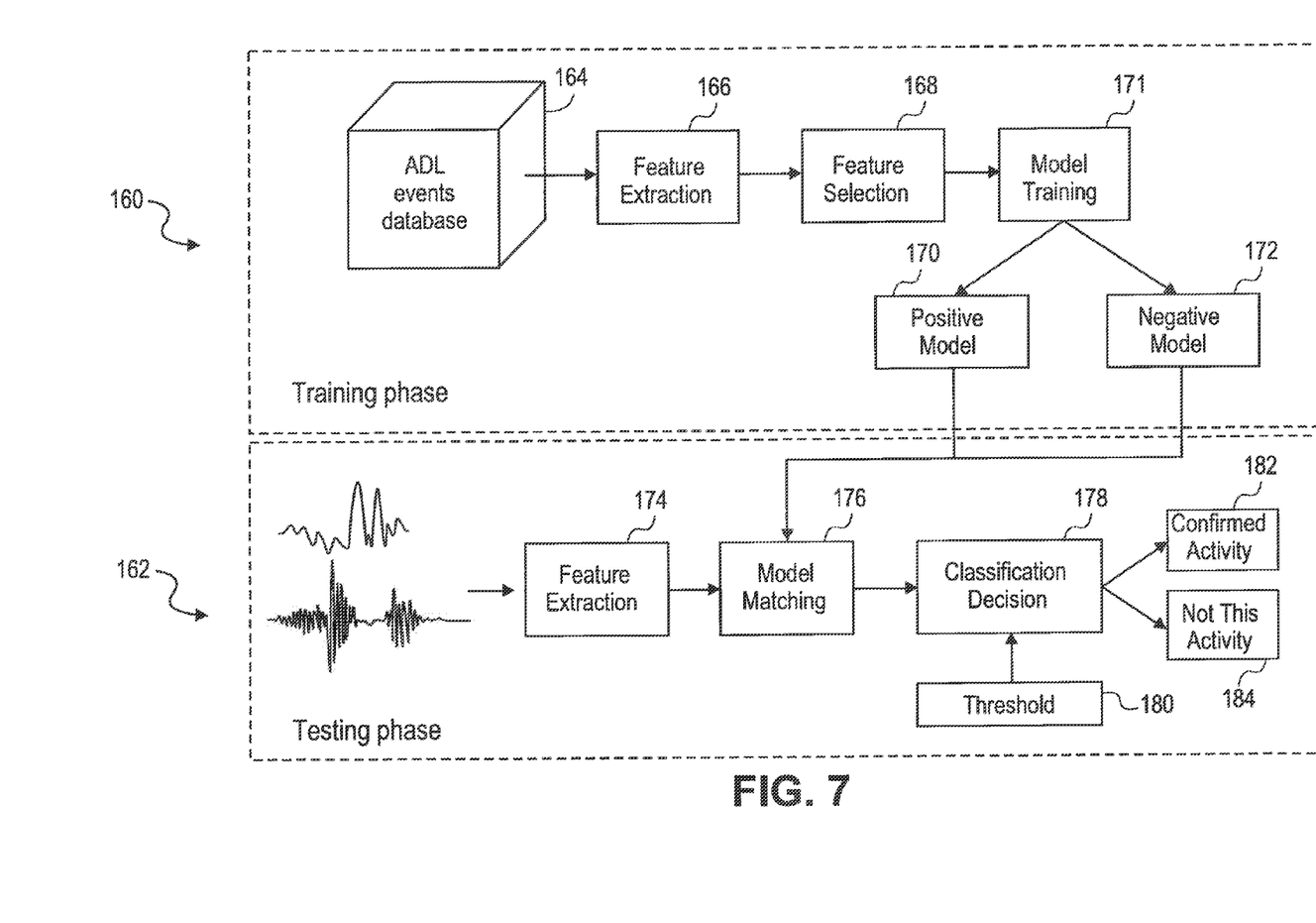
FIG. 7 is a block diagram of one embodiment of a classification method that may be employed to train and operate one or more classifiers for classifying human activities.

FIG. 7 is a block diagram of one embodiment of a classification method that may be employed to train and operate one or more classifiers. The method comprises two phases: a training stage 160 and a testing stage 162. The purpose of the training stage 160 is to train a model for each group of events: a positive indication of a user state 170 and a negative indication of the user state 172. The input to the training stage 160 is a set of measurement samples previously recorded from multi-sensor measurement sample data (e.g., from human volunteers) of events from each group. The input measurement samples undergo pre-processing and feature extraction. Then, a feature subset that best differentiates between the groups is selected, and a GMM model for each group is trained. The outputs of the training stage 160 are a set of indices, which represents the selected feature subset and the two GMM models 170, 172. These outputs are stored in the database 37 associated with the data monitoring and computation server 36.

More particularly, measurement data from prior confirmed fall, stumble, and ADL events received from either in-use or experimental subjects are received from one or more wearable devices 12a-12n (i.e., a form of adapting and system learning built into the system 10) into a portion of the database 37 designated as a multi-sensor measurement events database 164. The data is processed and relevant features are extracted from each multi-sensor measurement event in a feature extraction block 166. Gaussian mixture model (GMM) classifiers are implemented on a subset of a selected features space 168, selected via a sequential forward floating selection (SFFS) algorithm designed to maximize classifier performance. Each class, positive user state 170 and negative 172, is represented by a GMM trained using an expectation maximization algorithm 171.

In the testing stage 162, an unknown event is introduced to each of the classifiers 170, 172. The unknown event undergoes pre-processing, and the previously selected features are extracted in block 174 and saved as a feature matrix. A score is calculated for the unknown event in the model-matching phase 176. The classification decision 178 is based on a comparison of the score with a threshold 180 determined during the training phase 160 as either a confirmed specific user state 182 or not the specified user state 184.

Referring again to FIG. 3, at block S4, the wearable device 12a receives a command via the network from the cloud computing system 14 to contact a PSAP based on the location of the user 16a. The position/location of the user 16a may be, but is not limited to, latitude/longitude, a street/town/state address, etc. In one embodiment, the wearable device 12a includes in the datasets transmitted to the cloud computing system 14, its position/location obtained from the aGPS receiver 52. Based on the received location/position of the user 16a and the nature of the classified user state, the cloud computing system decides which type of PSAP 19 is most suited to handling the type of user state (e.g., a fall) and queries the database 37 as to the PSAP 19 of that type nearest to the position/location of the user 16a. In one embodiment, the selected PSAP 19 is transmitted to the wearable device 12a. In another embodiment, the wearable device 12a is instructed by the cloud computing system 14 to call a PSAP 19 known to the wearable device 12a based on its known location. In another embodiment, the wearable device automatically calls a PSAP 19 triggered by receiving the user state from the cloud computing system 14. In still another embodiment, in areas where a local PSAP 19 is not configured to accept recorded messages, the wearable device 12a may automatically call the call center 30, which in turn, relays the user state to the PSAP 19.

At block S5, the wearable device 12a contacts the selected PSAP 19 over the network (e.g., the cellular transmission network 20) using the cellular module 46. At block S6, the wearable device 12a transmits at least the user state to the PSAP 19. At block S7, the wearable device 12a transmits the location of the user 16a to the PSAP 19. In one embodiment, other information pertinent to the user 16 may be transmitted to the PSAP 19 including, but not limited to, one or more of the datasets, extracted features, and additional information the cloud computing system may retrieve from the database 37, including, but not limited to, identification information, medical history information, etc.

The wearable device 12a and/or the cloud computing system 14 may be configured to provide for a direct or a conference connection between the user 16a/wearable device 12a and the contacted PSAP 19 and/or the call center 30 and/or the first-to-answer systems 32 and/or care givers and/or family 34, who may further assess the "confirmed" user state by listening in or replaying audio data returned on command to/from the wearable device 12a via the Web server 28. Conversations with the user 16a may be employed to identify a false positive or a false negative. If the call to a PSAP 19 is placed as a conference call between the user 16a/wearable device 12a, the PSAP 19, and the call center 30, the call center 30 may interact with the PSAP personnel, providing information that can aid the PSAP personnel in handling the user state. This information may be provided by an operator at the call center 30 or an IVR system.

In one embodiment, an initial classification of an event (e.g., a large acceleration and orientation change followed by a long lye) may be diagnosed by the wearable device 12a without the intervention of the cloud computing system 14. In such circumstances, the wearable device 12a may places a call to the PSAP 19 and/or a call center 30 directly.

In another embodiment, classification may be performed by an individual (e.g., a family member, or a call center employee) using a mobile device or web browser to review the event information and/or talk to the user 16a.

In another embodiment, classification may be performed by the cloud computing system 14 with the assistance of a voice call, automatically placed from the wearable device 12a to a call center 30, where an operators view sensors information and user profile data and talks to the user 16a to determine the nature of the event.

In another embodiment, the user 16a may himself place a call to the call center 30, where an operators view sensors information and user profile data and talks to the user 16a to determine the nature of the event.

In one embodiment, classification may be dynamically adaptive in the sense that the cloud computing system 14 may automatically "learn" from previous classifications of events and datasets retrieved from the database 37. The retrieved data may be used to update or even completely change one or more currently employed classifiers.

The measurement data from past confirmed activities may be stored on the wearable device 12a or in the database 37 associated with the data monitoring and computation server 36 and later used if false classification was confirmed through the call center 30.

In such circumstances, an individualized classification dictionary may be employed so that future events are more precisely identified. The "dictionary" may be generic to the whole population, or different dictionaries may be used for different groups (e.g., female 80+, male 6-70, children, etc.). Furthermore, an individualized dictionary may be "learned" over time.

Different dictionaries may be employed in different circumstances—for example, if it is determined that a user 16a is driving, the dictionary may be switched from "female 80+" to a "driving" dictionary, and still further, once it has been determined that the user 16a has stopped driving and is walking, the dictionary may be switched back to the "female 80+" dictionary. Improved dictionaries may be redistributed to all of the wearable devices 12a-12n by the data monitoring and computation server 36 to permit the wearable devices 12a-12n to employ individual incidents to improve classification accuracy.

It should be noted that numerous variations of mechanisms discussed above can be used with embodiments of the present invention without loss of generality. For example, a person skilled in the art would also appreciate that the complete method described in FIG. 3 may be executed on a single embedded processor incorporated within the wearable device 12a. A person skilled in the art would also appreciate that, in addition to inconclusive events, measurement data and recorded audio and/or extracted features of initially confirmed activities may be passed on to the trained classifiers 170, 172 for a final decision (e.g., a re-confirmation of a fall or a re-classification as an ADL).

The combination of sensors may be employed to detect activities in various environments and during various circumstances such as but not limited to: inside a house, while sleeping, while walking or exercising outside the house, while in the shower, etc. The combination of sensors may be used to detect a "shower mode," wherein microphone and speaker levels are automatically adjusted to filter out ambient water noise. This may be achieved by running a simple algorithm on the microphone 48 output to detect that the user 16a is in the shower. When the user 16a is in a "shower mode," the wearable device 12a may employ a different algorithm and decision table to detect possible falls. As another example, the wearable device 12a can differentiate between a fall in the shower and a fall outside the shower.

The system 10 of FIGS. 1 and 2 may be modified to monitor other activities of humans automatically. For example, the system 10 may be modified to include video cameras for chilled monitoring.

Figure 8:
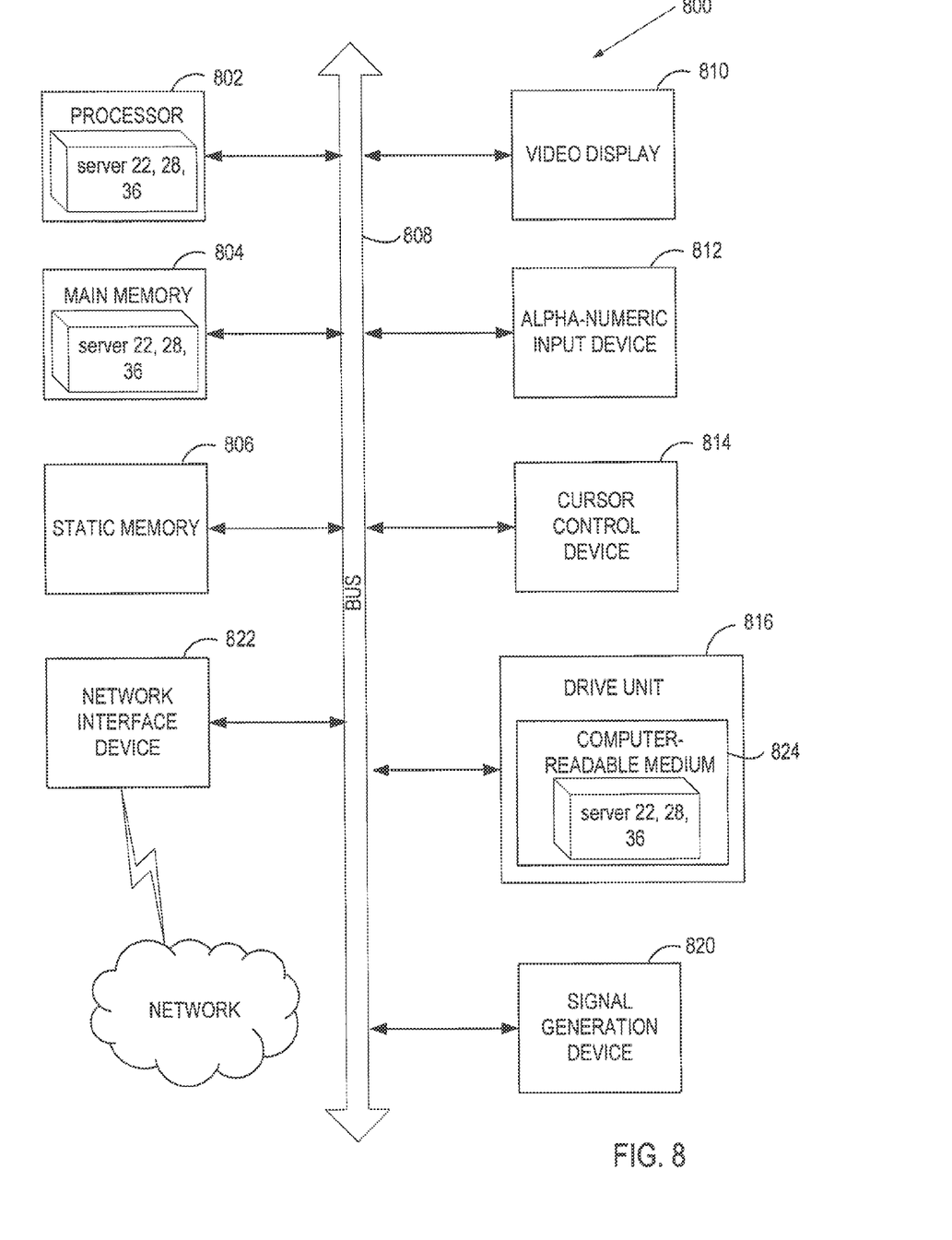
FIG. 8 illustrates one embodiment of a server within the system FIG. 1.

FIG. 8 illustrates an exemplary computer system 800 corresponding to one or more of the servers 22, 28, 36 of the distributed cloud computing system 14 of FIG. 1, within which a set of instructions, for causing the machine (i.e., the computer system 800) to perform any one or more of the methodologies discussed herein, may be executed. In some embodiments, the machine may be connected (e.g., networked) to other machines in a LAN, an intranet, an extranet, or the Internet 24. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processing system (processor) 802, a main memory 804 (e.g., read-only memory (ROM), flash memory, dynamic random access memory (DRAM) such as synchronous DRAM (SDRAM)), a static memory 806 (e.g., flash memory, static random access memory (SRAM)), and a data storage device 816, which communicate with each other via a bus 806.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 802 may also be one or more special-purpose processing devices such as an application specific integrated circuit (ASIC), a field programmable gate array (FPGA), a digital signal processor (DSP), network processor, or the like. The processor 802 is configured to execute instructions for performing the operations and steps discussed herein with respect to servers 22, 28 or 36.

The computer system 800 may further include a network interface device 822. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker).

A drive unit 816 may include a computer-readable medium 824 on which is stored one or more sets of instructions (e.g., instructions of one or more of the servers 22, 28, 36) embodying any one or more of the methodologies or functions described herein. The instructions of one or more of the servers 22, 28, 36 may also reside, completely or at least partially, within the main memory 804 and/or within the processor 802 during execution thereof by the computer system 800, the main memory 804 and the processor 802 also constituting computer-readable media. The instructions of one or more of the servers 22, 28, 36 may further be transmitted or received over a network via the network interface device 822.

While the computer-readable storage medium 824 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "extracting," "classifying,", "transmitting", "contacting", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A wearable apparatus for contacting a public safety access point (PSAP), the wearable apparatus comprising:
   a plurality of sensors for obtaining a plurality of datasets, wherein one of the plurality of datasets is a location of the user;
   a processor to:
      select, at least one of the plurality of datasets or features obtained by the plurality of sensors,
      determine whether the apparatus has a non-zero threshold amount of remaining processor power sufficient for feature extraction; and
      when the apparatus is determined to have a non-zero threshold amount of remaining processor power sufficient for feature extraction,
      extract at least one feature from the at least one selected dataset, and otherwise, use a cloud computing system to extract the at least one feature, when the apparatus is determined to not have a non-zero threshold amount of remaining processor power sufficient for feature extraction; and
   a cellular transceiver, coupled to the processor, to:
      transmit the at least one dataset to the cloud computing system over a cellular network, the apparatus further comprising an accelerometer to measure an acceleration of the user, wherein
      the at least one processor and the cellular transceiver are configured to:
      transmit the at least one dataset based on a measured change in acceleration of the user to at least one of the PSAP and the cloud computing system;
      receive a classification of the transmitted at least one dataset as one of a plurality of user states indicative of emergency assistance required by the user from the cloud computing system based on the features extracted from the datasets;
      and contact a PSAP based on the location of the user, the classification and a proximity of the PSAP to the location of the user.

2. The apparatus of claim 1, wherein the cellular transceiver is to transmit the one of the plurality of user states to the PSAP.

3. The apparatus of claim 1, the plurality of sensors comprising an aGPS receiver to determine the location of the user.

4. The apparatus of claim 1, wherein the cellular transceiver is to transmit the location of the user to the PSAP.

5. The apparatus of claim 1, wherein contacting the PSAP comprises selecting the PSAP based on a proximity of the PSAP to the location of the user.

6. The apparatus of claim 1, wherein the PSAP is at least one of 9-1-1 and an emergency response center.

7. The apparatus of claim 1, wherein the plurality of sensor comprises a microphone for receiving audio and the cellular transceiver is further to transmit the audio to the PSAP.

8. The apparatus of claim 1, wherein the cellular transceiver is to transmit information from the accelerometer about a measured change in acceleration of the user to at least one of the PSAP or the cloud computing system.

9. The apparatus of claim 7, wherein the microphone and the cellular transceiver are to permit a voice conversation between the user and the PSAP.

10. A method for contacting a public safety access point (PSAP), the method comprising:
   receiving, by a cloud computing system over a cellular network, at least one dataset from an the apparatus worn by a user, the dataset obtained from sensors, wherein the wearable apparatus selects the dataset to be used for extraction of a feature, wherein at least one extracted feature is extracted by the wearable apparatus when a remaining non-zero threshold amount of processing power of the wearable apparatus is sufficient for feature extraction and is otherwise extracted by the cloud computing system when the remaining non-zero threshold amount of processing power of the wearable apparatus is insufficient for feature extraction,
   and wherein the at least one dataset is a location of the user, the apparatus further comprising an accelerometer to measure an acceleration of the user, wherein the at least one dataset is transmitted based on a measured change in acceleration of the user to at least one of the PSAP and the cloud computing system;
   determining, by the cloud computing system, one of a plurality of user states indicative of emergency assistance required by the user, based on the at least one feature extracted from the at least one dataset;
   selecting a PSAP based on a proximity of the PSAP to the location of the user; and
   transmitting, by the cloud computing system, at least the one of the plurality of user states to the wearable apparatus to instruct the apparatus to contact the PSAP based on the location of the user and based on the determined one of the user states.

11. The method of claim 10, wherein the determining the one of the plurality of user states comprises classifying the at least one dataset as one of the plurality of user states.

12. The method of claim 10, further comprising transmitting, to the apparatus, data indicative of the PSAP to be contacted.

13. The method of claim 12, wherein the instruction to contact the PSAP is based on a proximity of the PSAP to the location of the user.

14. The method of claim 10, wherein the PSAP is at least one of 9-1-1 or an emergency response center.

15. The method of claim 10, further comprising providing a conference connection between the apparatus, the PSAP, and at least one of a call center or a care giver.

16. A non-transitory computer-readable medium including instructions that, when executed by a wearable device, cause the wearable device to perform operations comprising;
   obtaining datasets from a plurality of sensors, wherein one of datasets is a location of a user;
   determining an amount of an available processing power of the wearable device,
   selecting at least one of the obtained datasets;
   when the determined amount of available processing power of the wearable device is a non-zero amount that is insufficient to support feature extraction from the selected at least one of the datasets, transmitting the selected at least one of the datasets to at least one of a public safety access point (PSAP) and a cloud computing system over a cellular network, the apparatus further comprising an accelerometer to measure an acceleration of the user, wherein the at least one dataset is transmitted based on a measured change in acceleration of the user;
   receiving a classification of the at least one datasets as one of a plurality of user states indicative of emergency assistance required by the user from the cloud computing system based on at least one feature extracted from the datasets by the cloud computing system; and contacting, by the processing device, a PSAP based on the location of the user, the classification and a proximity of the PSAP to the location of the user.

17. The non-transitory computer-readable medium of claim 16, the operations further comprising transmitting the one of the plurality of user states to the PSAP.

* * * * *